(12) United States Patent
Gupta et al.

(10) Patent No.: US 12,166,753 B2
(45) Date of Patent: Dec. 10, 2024

(54) CONNECTING A SOFTWARE-DEFINED DATA CENTER TO CLOUD SERVICES THROUGH AN AGENT PLATFORM APPLIANCE

(71) Applicant: VMware, Inc., Palo Alto, CA (US)

(72) Inventors: Prateek Gupta, San Francisco, CA (US); Fnu Yashu, Sunnyvale, CA (US); John E. Brezak, Camano Island, WA (US)

(73) Assignee: VMware LLC, Palo Alto, CA (US)

( * ) Notice: Subject to any disclaimer, the term of this patent is extended or adjusted under 35 U.S.C. 154(b) by 216 days.

(21) Appl. No.: 17/853,805

(22) Filed: Jun. 29, 2022

(65) Prior Publication Data

US 2024/0007462 A1  Jan. 4, 2024

(51) Int. Cl.
*H04L 9/40* (2022.01)
*G06F 9/54* (2006.01)

(52) U.S. Cl.
CPC .......... *H04L 63/0853* (2013.01); *G06F 9/547* (2013.01); *H04L 63/0823* (2013.01); *H04L 63/20* (2013.01)

(58) Field of Classification Search
CPC . H04L 63/0853; H04L 63/08; H04L 63/0807; H04L 63/0823; H04L 63/20; G06F 9/547; G06F 21/335; G06F 21/606
See application file for complete search history.

(56) References Cited

U.S. PATENT DOCUMENTS

| | | | | |
|---|---|---|---|---|
| 10,855,464 B2* | 12/2020 | Nirwal | ................. | H04L 9/0891 |
| 2018/0145955 A1* | 5/2018 | Nirwal | ................. | H04L 63/068 |
| 2018/0165122 A1* | 6/2018 | Dobrev | ................. | G06F 8/60 |
| 2023/0171241 A1* | 6/2023 | Amichay | ............ | H04L 63/0876 |
| | | | | 726/4 |

OTHER PUBLICATIONS

"Getting Started with Token-Based Authentication for VMware Cloud Foundation APIs"—Amarnath Reddy, VMware Cloud Foundation, May 20, 2009 https://blogs.vmware.com/cloud-foundation/2020/05/20/getting-started-with-token-based-authentication-for-vmware-cloud-foundation-apis/ (Year: 2020).*

"VMware Cloud Foundation—APIs for Managing SOS" -Gary JBlake, VMware Cloud Foundation, My Cloudy World, Feb. 25, 2022 https://my-cloudy-world.com/2022/02/25/vmware-cloud-foundation-apis-for-managing-sos/ (Year: 2022).*

* cited by examiner

*Primary Examiner* — Randy A Scott
(74) *Attorney, Agent, or Firm* — Kim & Stewart LLP

(57) ABSTRACT

A method of connecting a software-defined data center (SDDC) to a cloud platform to enable the cloud platform to deliver cloud services to the SDDC includes the steps of: deploying an agent platform appliance that is connected to a management network of the SDDC; and deploying a plurality of agents on the agent platform appliance, wherein the agents include a first agent that is configured to issue a command to a component of the SDDC to perform an operation requested by a cloud service of the cloud platform and a second agent that is configured to acquire an authentication token for authenticating to the component of the SDDC, and wherein the second agent acquires the authentication token from the component of the SDDC, and the first agent acquires the authentication token from the second agent and transmits the command and the authentication token to the component of the SDDC.

20 Claims, 5 Drawing Sheets

| Privilege Mappings 182 |||
|---|---|---|
| Roles 210 | Privileges 220 | Authorized Cloud Service Agents 150 |
| role-name-1 | access-privilege-1<br>access-privilege-2 | agent-name-1 |
| role-name-2 | update-privilege-1 | agent-name-2<br>agent-name-3 |
| ⋮ |||

Figure 2

CONNECTING A SOFTWARE-DEFINED DATA CENTER TO CLOUD SERVICES THROUGH AN AGENT PLATFORM APPLIANCE

BACKGROUND

In a software-defined data center (SDDC), virtual infrastructure, which includes virtual machines (VMs) and virtualized storage and networking resources, is provisioned from hardware infrastructure that includes a plurality of host computers (hereinafter also referred to simply as "hosts"), storage devices, and networking devices. The provisioning of the virtual infrastructure is carried out by SDDC management software that is deployed on management appliances, such as a VMware vCenter Server® appliance and a VMware NSX® appliance, from VMware, Inc. The SDDC management software communicates with virtualization software (e.g., a hypervisor) installed in the hosts to manage the virtual infrastructure.

It has become common for multiple SDDCs to be deployed across multiple clusters of hosts. Each cluster is a group of hosts that are managed together by the management software to provide cluster-level functions, such as load balancing across the cluster through VM migration between the hosts, distributed power management, dynamic VM placement according to affinity and anti-affinity rules, and high availability (HA). The management software also manages a shared storage device to provision storage resources for the cluster from the shared storage device, and a software-defined network, through which the VMs communicate with each other. For some customers, their SDDCs are deployed across different geographical regions, and may even be deployed in a hybrid manner, e.g., on-premise, in a public cloud, and/or as a service. "SDDCs deployed on-premise" means that the SDDCs are provisioned in a private data center that is controlled by a particular organization. "SDDCs deployed in a public cloud" means that SDDCs of a particular organization are provisioned in a public data center along with SDDCs of other organizations. "SDDCs deployed as a service" means that the SDDCs are provided to the organization as a service on a subscription basis. As a result, the organization does not have to carry out management operations on the SDDC, such as configuration, upgrading, and patching, and the availability of the SDDCs is provided according to the service level agreement of the subscription.

With a large number of SDDCs, monitoring and performing operations on the SDDCs through interfaces, e.g., application programming interfaces (APIs), provided by the management software, and managing the lifecycle of the management software, have proven to be challenging. Conventional techniques for managing the SDDCs and the management software of the SDDCs are not practicable when there is a large number of SDDCs, especially when they are spread out across multiple geographical locations and in a hybrid manner.

SUMMARY

One or more embodiments provide a cloud platform from which various services, referred to herein as "cloud services" are delivered to the SDDCs through agents of the cloud services that are running in an appliance (referred to herein as an "agent platform appliance"). The cloud platform is a computing platform that hosts containers or virtual machines corresponding to the cloud services that are delivered from the cloud platform. The agent platform appliance is deployed in the same customer environment, e.g., a private data center, as the management appliances of the SDDCs. In one embodiment, the cloud platform is provisioned in a public cloud and the agent platform appliance is provisioned as a virtual machine in the customer environment, and the two communicate over a public network, such as the Internet. In addition, the agent platform appliance and the management appliances communicate with each other over a private physical network, e.g., a local area network. Examples of cloud services that are delivered include an SDDC configuration service, an SDDC upgrade service, an SDDC monitoring service, an SDDC inventory service, and a message broker service. Each of these cloud services has a corresponding agent deployed on the agent platform appliance. All communication between the cloud services and the management software of the SDDCs is carried out through the agent platform appliance, for example, through respective agents of the cloud services that are deployed on the agent platform appliance.

One or more embodiments provide a method of connecting an SDDC to a cloud platform to enable the cloud platform to deliver cloud services to the SDDC. The method includes the steps of: deploying an agent platform appliance that is connected to a management network of the SDDC; and deploying a plurality of agents on the agent platform appliance, wherein the agents include a first agent that is configured to issue a command to a component of the SDDC (e.g., SDDC management software) to perform an operation requested by a cloud service of the cloud platform and a second agent that is configured to acquire an authentication token for authenticating to the component of the SDDC that the first agent is authorized to issue the command to the component of the SDDC. In response to a request from the cloud service to perform the operation on the component of the SDDC, the second agent acquires the authentication token from the component of the SDDC, and the first agent acquires the authentication token from the second agent and transmits the command and the authentication token to the component of the SDDC.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 2 is a block diagram illustrating an example of mappings between cloud service agents and privileges for interfacing with a component of each of a tenant's SDDCs.

DETAILED DESCRIPTION

Techniques for connecting a tenant's SDDCs to a cloud platform are described. According to embodiments, an agent platform appliance is deployed in a customer environment of the tenant, the customer environment including one or more SDDCs with management software for the SDDCs executing therein. The agent platform appliance is connected to the same management network as management appliances on which the management software is deployed. To connect the tenant's SDDCs to cloud services of the cloud platform, agents are deployed on the agent platform appliance. The agents perform various functionalities, including transmitting commands to the management software of the SDDCs, acquiring authentication tokens for authenticating with the management software, and acquiring access tokens for authenticating with the cloud services.

Communications between the agent platform appliance and the cloud platform are authenticated using tokens (hereinafter referred to as "access tokens"). Furthermore, communications between the agent platform appliance and the SDDCs are authenticated using tokens (hereinafter referred to as "authentication tokens"). Accordingly, through the agent platform appliance, the cloud platform delivers cloud services to the management software. The cloud platform delivers such cloud services securely without burdensome overhead such as establishing VPNs, which allows for efficiency and scalability.

Figure 1:
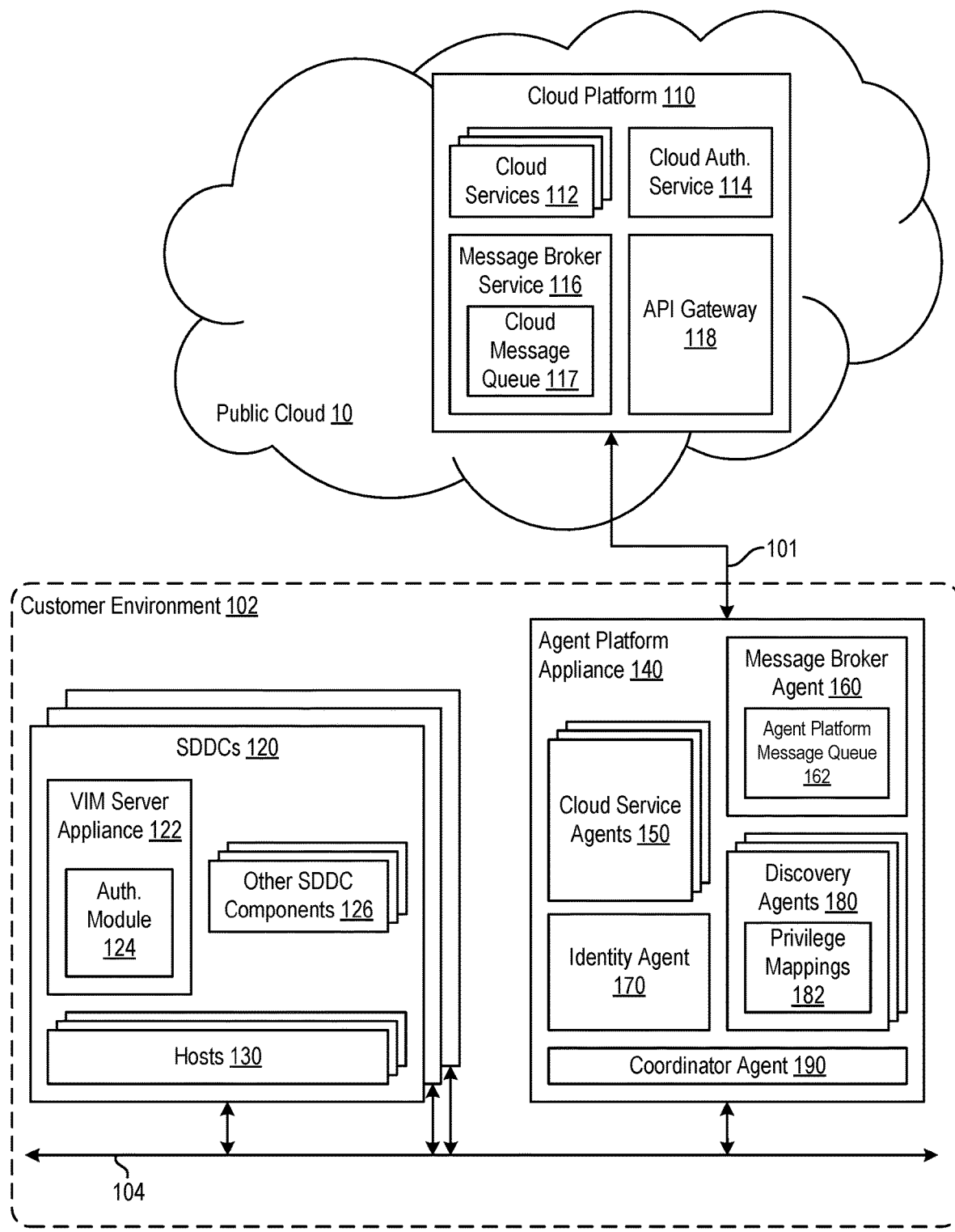
FIG. 1 is a block diagram of a computer system in which embodiments may be implemented.

FIG. 1 is a block diagram of a computer system in which embodiments may be implemented. The computer system includes a multi-tenant cloud platform 110 deployed in a public cloud 10, and a customer environment 102, in which SDDCs 120 of a particular tenant are deployed. Communications between cloud platform 110 and SDDCs 120 are carried out via an agent platform appliance 140 of customer environment 102. Communications between cloud platform 110 and agent platform appliance 140 are carried out over a public network 101, such as the Internet.

Each of SDDCs 120 includes hosts 130, hosts 130 being constructed on server grade hardware platforms (not shown) such as x86 architecture platforms. Hosts 130 include conventional components of computing devices (not shown), such as one or more central processing units (CPUs), memory such as random-access memory (RAM), local storage such as one or more magnetic drives or solid-state drives (SSDs) and/or a host bus adapter for connection to a storage area network, and one or more network interface cards (NICs). The NIC(s) enable hosts 130 to communicate with each other and with other devices over a management network 104. Hosts 130 include software platforms including hypervisors (not shown), which are virtualization software layers that support VM execution spaces (not shown) within which VMs are concurrently instantiated and executed. Each of SDDCs 120 also includes additional hardware devices (not shown) such as shared storage and networking devices.

Each of SDDCs 120 includes a VIM server appliance 122 and other SDDC components 126 each running various management software. VIM server appliance 122 logically groups hosts 130 into a cluster to perform cluster-level tasks such as provisioning and managing VMs and migrating VMs from one host 130 to another. One example of VIM server appliance 122 is a VMware vCenter Server® appliance from VMware, Inc. Other SDDC components 126 provide other management functionalities such as provisioning virtual networking resources. An example of one of other SDDC components 126 is a VMware NSX® appliance from VMware, Inc.

VIM server appliance 122 and other SDDC components 126 communicate via management network 104, and the various management software running thereon are referred to collectively herein as "management software." Management network 104 is distinguishable from public network 101 in that it is a private network, e.g., a local area network or a sub-net, and is partitioned from public network 101 through a firewall. In some embodiments, each of the SDDC components including VIM server appliance 122 is a VM instantiated on one or more of hosts 130. In other embodiments, each of the SDDC components may be implemented as a physical host having the conventional hardware platform described above with respect to hosts 130.

VIM server appliance 122 includes an authentication module 124, which authenticates requests for access. When it is able to authenticate such requests, authentication module 124 issues role-based authentication tokens such as Security Assertions Markup Language (SAML) tokens. Each authentication token allows a party possessing the token to access VIM server appliance 122 to perform an operation on VIM server appliance 122 that is associated with the issued token. Other SDDC components 126 similarly each include an authentication module (not shown), which issues role-based authentication tokens for requesting parties. For security purposes, authentication tokens each have a specified time-to-live (TTL), after which the tokens expire.

Cloud platform 110 is provisioned in public cloud 10, and public cloud 10 is operated by a cloud computing service provider, from a plurality of physical host computers (not shown). Cloud platform 110 includes cloud services 112, a cloud authentication service 114, a message broker service 116, and an API gateway 118. Cloud services 112 include an SDDC configuration service, an SDDC upgrade service, an SDDC monitoring service, and an SDDC inventory service. Message broker service 116 and API gateway 118 provide multiple methods of communicating securely with cloud services 112, as discussed further below.

Cloud authentication service 114 enables authentication with cloud services 112 and with message broker service 116. To enable such authentication, cloud authentication service 114 issues access tokens such as JavaScript Object Notation (JSON) web tokens (JWTs). Each access token allows a requesting party to interface with cloud services 112 through either message broker service 116 or API gateway 118, as discussed below. It should be noted that although cloud authentication service 114 is illustrated as being within cloud platform 110, cloud authentication service 114 may run on a virtual or physical server that is not part of cloud platform 110. For security purposes, access tokens each have a specified TTL, after which the tokens expire.

Agent platform appliance 140 is, e.g., a physical server, or a VM deployed on a host similar to hosts 130, the host including a CPU(s) configured to execute instructions such as executable instructions that perform one or more operations described herein and including memory in which such executable instructions are stored. Agent platform appliance 140 is also connected to management network 104 such that agent platform appliance 140 and SDDCs 120 are on the same side of a firewall (not shown) of customer environment 102. As a result, communications between agent platform appliance 140 and SDDCs 120 are secure and protected from attacks originating from outside customer environment 102 such as snooping attacks.

On agent platform appliance 140, various agents are deployed, including cloud service agents 150, a message broker agent 160, an identity agent 170, discovery agents 180, and a coordinator agent 190. The agents on agent platform appliance 140 communicate with each other, e.g., through hypertext transfer protocol (HTTP) APIs. The agents on agent platform appliance 140 also communicate with SDDCs 120 and cloud platform 110, as discussed further below. Coordinator agent 190 deploys the agents on agent platform appliance 140, managing the lifecycle and orchestration thereof.

Cloud service agents 150, which correspond to cloud services 112, issue commands to the management software of SDDCs 120 and report results of operations to cloud services 112. One method through which cloud service agents 150 communicate with cloud services 112 is through APIs of cloud services 112. Cloud service agents 150 make API calls via API gateway 118 to cloud services 112, e.g., to report operational statuses of cloud service agents 150, also referred to as "heartbeats," and to report results of operations performed by the management software of SDDCs 120.

Message broker agent 160 provides another method through which cloud service agents 150 communicate with cloud services 112. Cloud service agents 150 transmit messages to message broker agent 160, referred to herein as "agent-to-cloud" messages. Each agent-to-cloud message includes the name of one of cloud services 112, which is the intended recipient. Message broker agent 160 temporarily stores agent-to-cloud messages in an agent platform message queue 162. Similarly, cloud services 112 transmit messages to message broker service 116. Each message from one of cloud services 112, referred to herein as a "cloud-to-agent" message, may include the name of one of cloud service agents 150 as the intended recipient. Message broker service 116 temporarily stores cloud-to-agent messages in queues corresponding to various tenants, including a cloud message queue 117 corresponding to the tenant of SDDCs 120.

To provide agent-to-cloud messages to cloud services 112 and cloud-to-agent messages to cloud service agents 150, message broker service 116 and message broker agent 160 exchanges messages, e.g., periodically. Specifically, message broker agent 160 initiates the exchange with message broker service 116. Message broker agent 160 transmits agent-to-cloud messages to message broker service 116, which forwards them to cloud services 112. In exchange, message broker service 116 transmits cloud-to-agent messages to message broker agent 160, which forwards them to cloud service agents 150. The exchange of messages is discussed further below in conjunction with FIG. 5.

Identity agent 170 is deployed on agent platform appliance 140 to acquire access tokens from cloud authentication service 114. Identity agent 170, when deployed, is given access to a private key of the tenant and transmits a challenge phrase that is signed with the private key as payload for authenticating with cloud authentication service 114. In response, cloud authentication service 114 decrypts the payload using a public key of the tenant and issues an access token for the tenant if the decrypted payload matches the challenge phrase. The access token enables one of cloud service agents 150 or message broker agent 160 to authenticate with cloud platform 110.

Discovery agents 180 are deployed on agent platform appliance 140 to manage communication with the management software of SDDCs 120. Each of discovery agents 180 corresponds to one type of management software for all of SDDCs 120. For example, one discovery agent is deployed for VIM server appliances 122 of all of SDDCs 120, and other discovery agents are deployed respectively for other SDDC components 126 of all of SDDCs 120. Each of discovery agents 180 is also configured to acquire access tokens from cloud authentication service 114 in the same manner as identity agent 170. Discovery agents 180 acquire access tokens to enable cloud service agents 150 to directly report results of operations performed by the respective management software, via APIs of cloud services 112, without having to go through message broker agent 160.

Each of discovery agents 180 also communicates with its respective SDDC components, such as VIM server appliance 122, to acquire authentication tokens. To enable this, discovery agent 180 maintains a set of privilege mappings 182. Privilege mappings 182 indicate which "roles" cloud service agents 150 are authorized for and what privileges are associated with these roles. Privilege mappings 182 are discussed further below in conjunction with FIG. 2.

In one embodiment, each of the cloud services is a microservice that is implemented as one or more container images executed on a virtual infrastructure of public cloud 10. Similarly, each of the agents deployed on agent platform appliance 140 is a microservice that is implemented as one or more container images executing in agent platform appliance 140.

FIG. 2 is a block diagram illustrating an example of privilege mappings 182. Privilege mappings 182 include a plurality of roles 210, each of roles 210 corresponding to one or more privileges 220 and one or more authorized cloud service agents 150. For example, some privileges 220 may allow for the access of specified data or metadata of an SDDC component, while other privileges 220 may allow for the updating of specified data or metadata of the SDDC component such as for the creation or deletion of a VM by VIM server appliance 122.

A first role named "role-name-1" is associated with two privileges: an "access-privilege-1" and an "access-privilege-2." Each of the two privileges associated with role-name-1 authorize the retrieval of specified data or metadata. As depicted, "agent-name-1" is assigned role-name-1. Accordingly, if agent-name-1 requests an authentication token from discovery agent 180 for role-name-1, discovery agent 180 acquires the authentication token from the SDDC component. The authentication token that is acquired is scoped by the SDDC component to permit retrieval of the data or metadata specified by access-privilege-1 and access-privilege-2.

A second role named "role-name-2" is associated with one privilege: an "update-privilege-1." Update-privilege-1 authorizes the updating of specified data or metadata. As depicted, two agents named "agent-name-2" and "agent-name-3" are assigned role-name-2. Accordingly, if agent-name-2 or agent-name-3 requests an authentication token from discovery agent 180 for role-name-2, discovery agent 180 acquires the authentication token from the SDDC component. The authentication token that is acquired is scoped by the SDDC component to permit the updating of the data or metadata specified by update-privilege-1.

If one of cloud service agents 150 not identified as being authorized for a particular authentication token requests the authentication token from discovery agent 180, the request will be rejected. In addition, if one of cloud service agents 150 attempts to retrieve or update data or metadata of an SDDC component that is outside the scope of an acquired authentication token, the attempt will fail.

Figure 3:
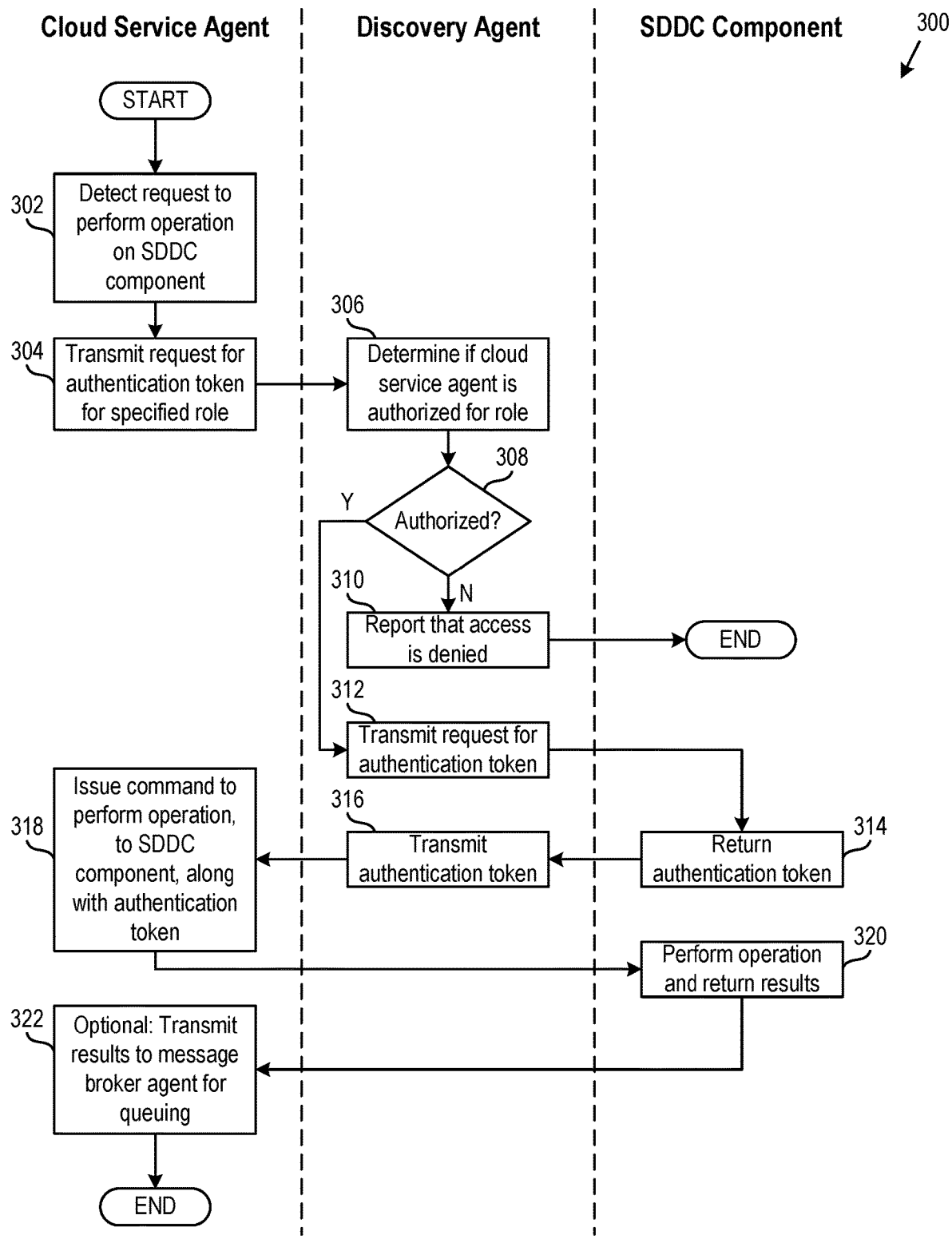
FIG. 3 is a flow diagram of steps performed by a cloud service agent, a discovery agent, and a component of an SDDC to carry out a method of acquiring an authentication token for authenticating with the component of the SDDC.

FIG. 3 is a flow diagram of steps performed to acquire an authentication token for accessing an SDDC component of one of SDDCs 120 when one of cloud service agents 150 is processing a request from a corresponding cloud service.

At step 302, cloud service agent 150 detects a request to access the SDDC component, from one of cloud services 112. In one embodiment, the request was transmitted by message broker service 116 to message broker agent 160 in a message exchange (described below in conjunction with FIG. 5), and was provided to cloud service agent 150. The requested access may be, e.g., to retrieve or update data or metadata associated with one of privileges 220.

At step 304, cloud service agent 150 transmits a request to discovery agent 180 for an authentication token. The request for an authentication token specifies the name of a role, e.g., "role-name-1." At step 306, discovery agent 180 checks privilege mappings 182 to determine if cloud service agent 150 is authorized for the requested role.

At step 308, if cloud service agent 150 is not authorized, the request is rejected, and method 300 moves to step 310. At step 310, discovery agent 180 notifies cloud service agent 150 that access to the SDDC component is denied. After step 310, method 300 ends.

Returning to step 308, if cloud service agent 150 is authorized for the specified role, method 300 moves to step 312. At step 312, discovery agent 180 transmits a request to the SDDC component for the authentication token that is scoped to the specified role. At step 314, the authentication module of the SDDC component returns the requested authentication token to discovery agent 180. At step 316, discovery agent 180 transmits the authentication token to cloud service agent 150.

At step 318, cloud service agent 150 accesses the SDDC component using the authentication acquired from discovery agent 180 to retrieve or update specified data or metadata of the SDDC component. At step 320, upon verifying that the request is within the scope of the authentication token, the SDDC component performs the requested access, e.g., retrieving or updating the data or metadata of the SDDC component. The SDDC component then transmits the results of the operation to cloud service agent 150. At step 322, as an optional step, cloud service agent 150 transmits the results of the operation as a message to message broker agent 160, for queuing in agent platform message queue 162. The message includes the name of cloud service 112 as the intended recipient. Step 322 is unneeded if cloud service agent 150 instead communicates the results of the operation directly to cloud platform 110 via an API of cloud service 112 through API gateway 118. After step 322, method 300 ends.

Figure 4:
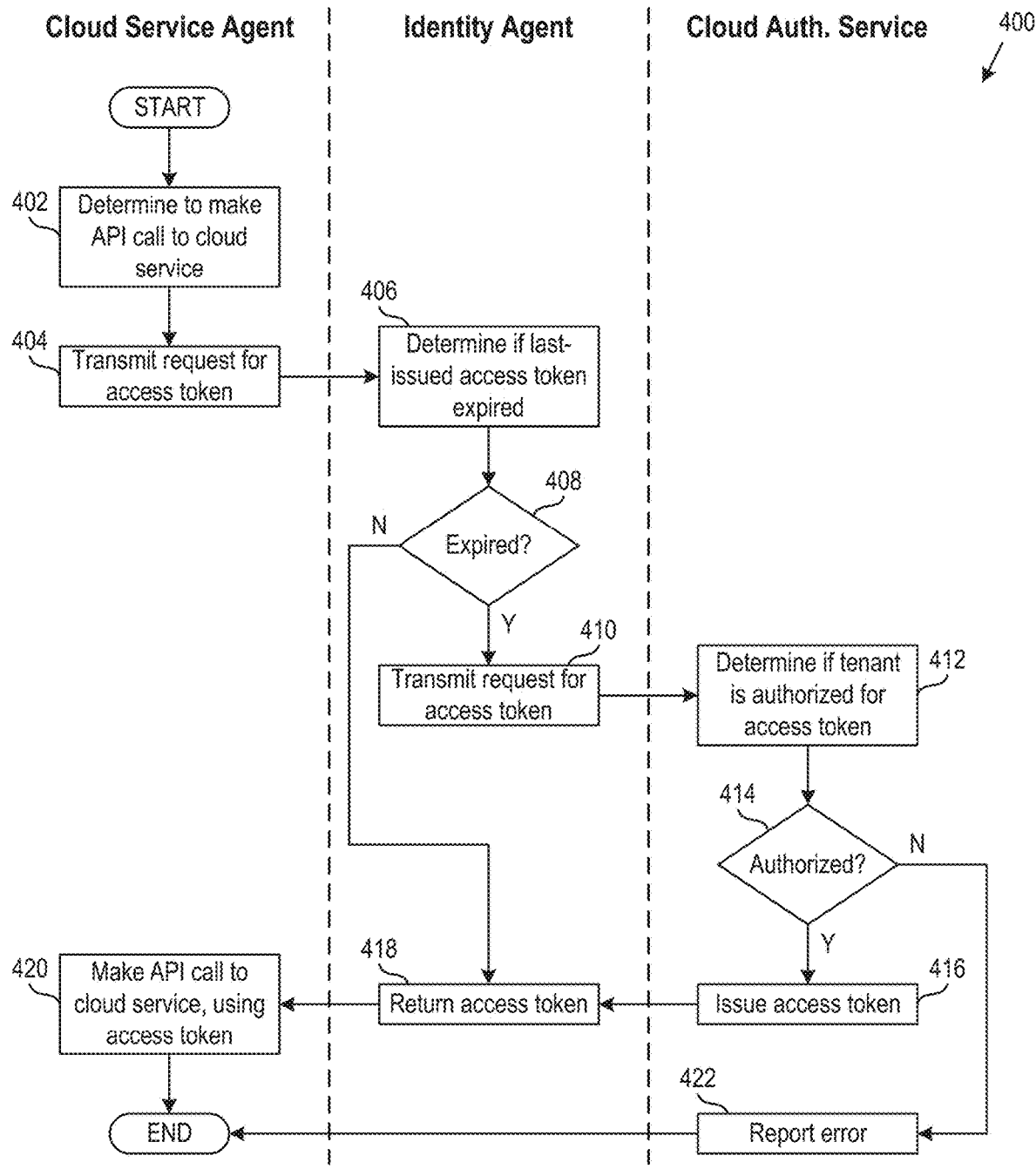
FIG. 4 is a flow diagram of steps performed by the cloud service agent, an identity agent, and a cloud authentication service to carry out a method of acquiring an access token for authenticating with a cloud service.

FIG. 4 is a flow diagram of steps performed by one of cloud service agents 150, identity agent 170, and cloud authentication service 114 to carry out a method 400 of acquiring an access token for authenticating with one of cloud services 112. Specifically, method 400 is used for communicating with cloud platform 110 via an API of cloud service 112.

At step 402, cloud service agent 150 determines to make an API call to cloud service 112. In one example, cloud service agent 150 is reporting a heartbeat. At step 404, cloud service agent 150 transmits a request to identity agent 170 for an access token. At step 406, identity agent 170 determines if the last access token (if any) acquired by identity agent 170 is expired, i.e., if the TTL thereof has lapsed. At step 408, if the last-issued access token is still active, method 400 moves to step 420. Otherwise, if the last-issued access token has expired (or if identity agent 170 has not yet acquired an access token), method 400 moves to step 410. At step 410, identity agent 170 transmits a request to cloud authentication service 114 for a new access token, the request including a payload containing the challenge phrase that is digitally signed using the private key of the tenant, as described above.

At step 412, cloud authentication service 114 determines if the tenant is authorized for an access token by decrypting the payload in the request using the public key of the tenant and confirming the challenge phrase in the manner described above. At step 414, if the tenant is authorized, method 400 moves to step 416, and cloud authentication service 114 issues a new access token to identity agent 170. At step 418, identity agent 170 returns an access token to cloud service agent 150, the access token being either a previously issued access token determined to be active at step 408 or an access token issued at step 416.

At step 420, cloud service agent 150 makes an API call containing the access token via API gateway 118, to report its heartbeat. After step 420, method 400 ends. Returning to step 414, if the tenant is not authorized, method 400 moves to step 422. At step 422, cloud authentication service 114 reports an error, notifying identity agent 170 that the new access token cannot be issued. After step 422, method 400 ends.

As previously mentioned, each of identity agent 170 and discovery agent 180 are configured to acquire access tokens. In one embodiment, when cloud service agent 150 is reporting a heartbeat, cloud service agent 150 obtains the access token from identity agent 170, and when cloud service agent 150 is reporting a result of an operation by an SDDC component, cloud service agent 150 obtains the access token from discovery agent 180. Accordingly, steps of method 400 performed by identity agent 170 may alternatively be performed by discovery agent 180.

Figure 5:
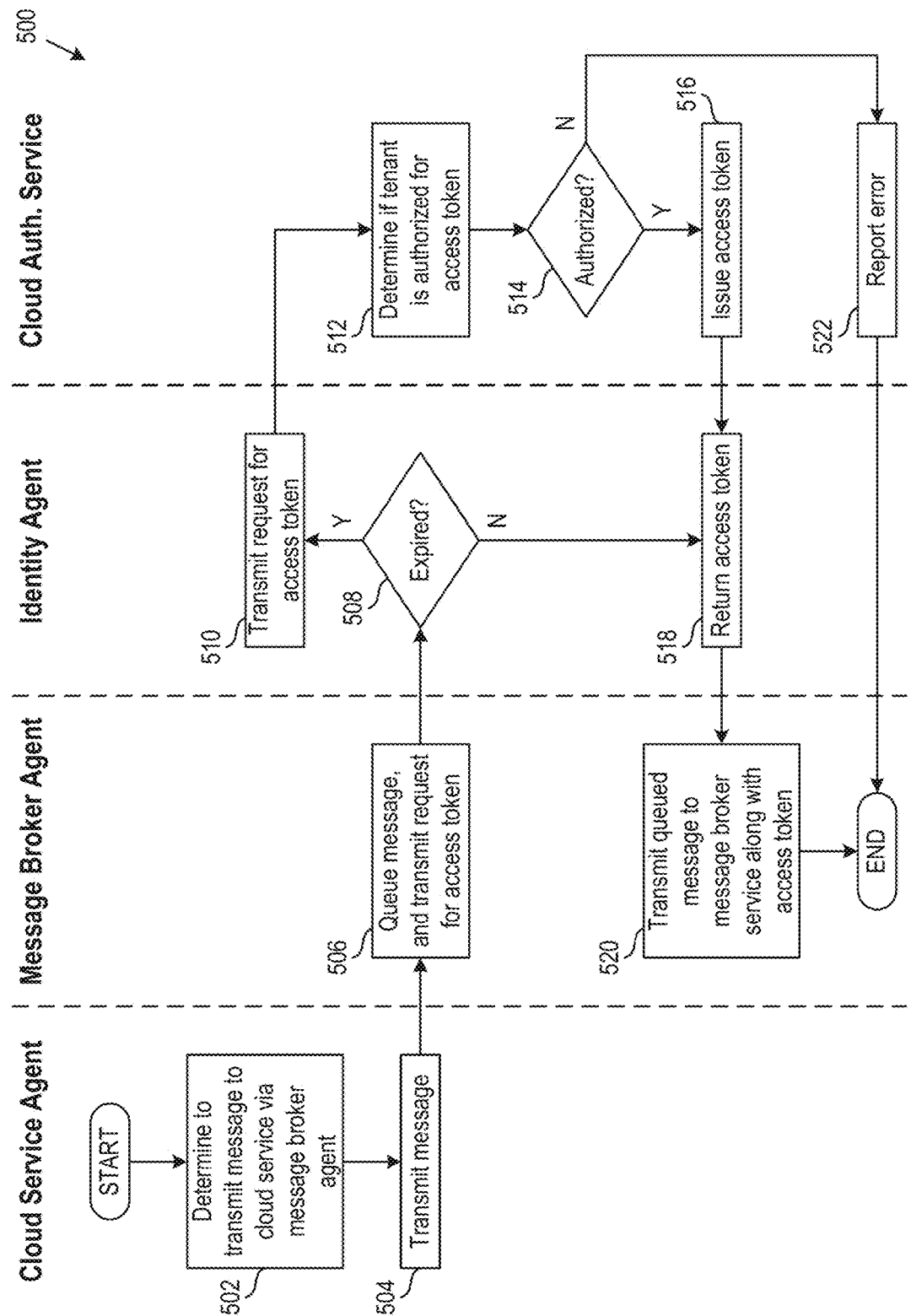
FIG. 5 is a flow diagram of steps performed by the cloud service agent, a message broker agent, the identity agent, and the cloud authentication service to carry out another method of acquiring an access token for authenticating with the cloud service.

FIG. 5 is a flow diagram of steps performed by one of cloud service agents 150, message broker agent 160, identity agent 170, and cloud authentication service 114 to carry out a method 500 of acquiring an access token for authenticating with one of cloud services 112. Specifically, method 500 is used for communicating with cloud platform 110 via a message exchange between message broker agent 160 and message broker service 116.

At step 502, cloud service agent 150 determines to transmit an agent-to-cloud message to cloud service 112. For example, cloud service agent 150 may be reporting a result of an operation performed by an SDDC component. At step 504, cloud service agent 150 transmits a message to message broker agent 160, e.g., including the result of the operation. The message further includes the name of cloud service 112.

At step 506, message broker agent 160 queues the message in agent platform message queue 162 and transmits a request to identity agent 170 for an access token. Message broker agent 160 may transmit the request for the access token after a predetermined time period elapses. Alternatively, message broker agent 160 may transmit the request for the access token immediately upon receiving the message from cloud service agent 150.

At step 508, identity agent 170 determines if the last access token (if any) acquired by identity agent 170 is expired, i.e., if the TTL thereof has lapsed. If the last-issued access token is still active, method 500 moves to step 518. Otherwise, if the last-issued access token has expired (or if identity agent 170 has not yet acquired an access token), method 500 moves to step 510.

At step 510, identity agent 170 transmits a request to cloud authentication service 114 for an access token in the same manner described above for step 410. At step 512, cloud authentication service 114 determines if the access token should be issued, in the same manner described above for step 412. At step 514, if the tenant is authorized, method 500 moves to step 516, and cloud authentication service 114 issues an access token to identity agent 170. At step 518, identity agent 170 returns an access token to message broker agent 160, the access token being either a previously issued access token determined to be active at step 508 or an access token issued at step 516.

At step 520, message broker agent 160 transmits queued messages from agent platform message queue 162 to message broker service 116, along with the access token. After step 520, method 500 ends, and message broker service 116 provides the agent-to-cloud message to cloud service 112 identified in the message. Furthermore, message broker service 116 transmits any queued cloud-to-agent messages from cloud message queue 117 to message broker agent 160, which provides the cloud-to-agent messages to agents 150 identified in the messages. Returning to step 514, if the tenant is not authorized, method 500 moves to step 522. At step 522, cloud authentication service 114 reports an error, notifying identity agent 170 that the access token cannot be issued. After step 522, method 500 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are hard disk drives (HDDs), SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest operating system (OS) that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of connecting a software-defined data center (SDDC) to a cloud platform to enable the cloud platform to deliver cloud services to the SDDC, comprising:
   deploying an agent platform appliance that is connected to a management network of the SDDC; and
   deploying a plurality of agents on the agent platform appliance, wherein the agents include a cloud service agent that corresponds to a cloud service of the cloud services and that is configured to communicate with the cloud service and to issue commands to a component of the SDDC to perform operations requested by the cloud service, and the agents further include a discovery agent that corresponds to the component of the SDDC and that is configured to communicate with the component of the SDDC to acquire an authentication token associated with authentication privileges for performing operations on the component of the SDDC, and wherein
   in response to a request from the cloud service to perform an operation on the component of the SDDC, the discovery agent acquires the authentication token from the component of the SDDC, and the cloud service agent acquires the authentication token from the discovery agent and transmits to the component of the SDDC, the authentication token and a command to perform the operation.

2. The method of claim 1, wherein upon determining that the operation has completed, the cloud service agent generates a message for the cloud service, the message reporting a result of the operation.

3. The method of claim 2, wherein the agents further include a message broker agent that is configured to queue messages for the cloud platform including the message generated by the cloud service agent, and to transmit the queued messages to the cloud platform.

4. The method of claim 3, wherein the message broker agent is further configured to acquire an access token for authenticating to the cloud platform that the message broker agent is authorized to transmit messages to the cloud platform, and to transmit the queued messages to the cloud platform along with the access token.

5. The method of claim 4, wherein the agents further include an identity agent that is configured to authenticate with a cloud authentication service to obtain the access token, and the message broker agent acquires the access token from the identity agent.

6. The method of claim 1, wherein upon determining that the operation has completed, the cloud service agent makes an application programming interface (API) call to the cloud service, with an access token for authenticating to the cloud platform that the cloud service agent is authorized to transmit messages to the cloud platform.

7. The method of claim 6, wherein the discovery agent is further configured to authenticate with a cloud authentication service to obtain the access token, and the cloud service agent acquires the access token from the discovery agent.

8. A non-transitory computer-readable medium comprising instructions that are executable in a computer system, wherein the instructions when executed cause the computer system to carry out a method of connecting a software-defined data center (SDDC) to a cloud platform to enable the cloud platform to deliver cloud services to the SDDC, and wherein the method comprises:
  deploying an agent platform appliance that is connected to a management network of the SDDC; and
  deploying a plurality of agents on the agent platform appliance, wherein the agents include a cloud service agent that corresponds to a cloud service of the cloud services and that is configured to communicate with the cloud service and to issue commands to a component of the SDDC to perform operations requested by the cloud service, and the agents further include a discovery agent that corresponds to the component of the SDDC and that is configured to communicate with the component of the SDDC to acquire an authentication token associated with authentication privileges for performing operations on the component of the SDDC, and wherein
  in response to a request from the cloud service to perform an operation on the component of the SDDC, the discovery agent acquires the authentication token from the component of the SDDC, and the cloud service agent acquires the authentication token from the discovery agent and transmits to the component of the SDDC, the authentication token and a command to perform the operation.

9. The non-transitory computer-readable medium of claim 8, wherein upon determining that the operation has completed, the cloud service agent generates a message for the cloud service, the message reporting a result of the operation.

10. The non-transitory computer-readable medium of claim 9, wherein the agents further include a message broker agent that is configured to queue messages for the cloud platform including the message generated by the cloud service agent, and to transmit the queued messages to the cloud platform.

11. The non-transitory computer-readable medium of claim 10, wherein the message broker agent is further configured to acquire an access token for authenticating to the cloud platform that the message broker agent is authorized to transmit messages to the cloud platform, and to transmit the queued messages to the cloud platform along with the access token.

12. The non-transitory computer-readable medium of claim 11, wherein the agents further include an identity agent that is configured to authenticate with a cloud authentication service to obtain the access token, and the message broker agent acquires the access token from the identity agent.

13. The non-transitory computer-readable medium of claim 8, wherein upon determining that the operation has completed, the cloud service agent makes an application programming interface (API) call to the cloud service, with an access token for authenticating to the cloud platform that the cloud service agent is authorized to transmit messages to the cloud platform.

14. The non-transitory computer-readable medium of claim 13, wherein the discovery agent is further configured to authenticate with a cloud authentication service to obtain the access token, and the cloud service agent acquires the access token from the discovery agent.

15. A computer system comprising a plurality of servers, the plurality of servers including an agent platform appliance connected to a management network of a software-defined data center (SDDC), and the agent platform appliance including a plurality of agents deployed thereon, wherein
  the agents include a cloud service agent that corresponds to a cloud service of a plurality of cloud services and that is configured to communicate with the cloud service and to issue commands to a component of the SDDC to perform operations requested by the cloud service, and the agents further include a discovery agent that corresponds to the component of the SDDC and that is configured to communicate with the component of the SDDC to acquire an authentication token associated with authentication privileges for performing operations on the component of the SDDC, and
  in response to a request from the cloud service to perform an operation on the component of the SDDC, the discovery agent acquires the authentication token from the component of the SDDC, and the cloud service agent acquires the authentication token from the discovery agent and transmits to the component of the SDDC, the authentication token and a command to perform the operation.

16. The computer system of claim 15, wherein upon determining that the operation has completed, the cloud service agent generates a message for the cloud service, the message reporting a result of the operation.

17. The computer system of claim 16, wherein the agents further include a message broker agent that is configured to queue messages for a cloud platform that delivers the cloud services to the SDDC, the messages including the message generated by the cloud service agent, and to transmit the queued messages to the cloud platform.

18. The computer system of claim 17, wherein the message broker agent is further configured to acquire an access token for authenticating to the cloud platform that the message broker agent is authorized to transmit messages to the cloud platform, and to transmit the queued messages to the cloud platform along with the access token.

19. The computer system of claim 18, wherein the agents further include an identity agent that is configured to authenticate with a cloud authentication service to obtain the access token, and the message broker agent acquires the access token from the identity agent.

20. The computer system of claim 15, wherein upon determining that the operation has completed, the cloud service agent makes an application programming interface (API) call to the cloud service, with an access token for authenticating to a cloud platform that delivers the cloud services to the SDDC, that the cloud service agent is authorized to transmit messages to the cloud platform.

* * * * *